J. B. DYER & G. A. JOHNSTONE.
SYSTEM FOR ELECTRICAL DISTRIBUTION.
APPLICATION FILED FEB. 16, 1912.
1,150,019.                                                                 Patented Aug. 17, 1915.
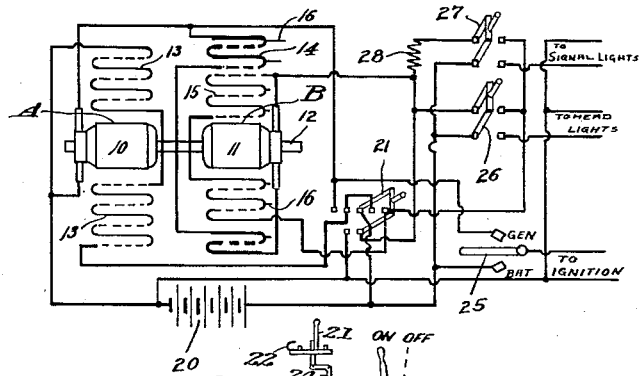
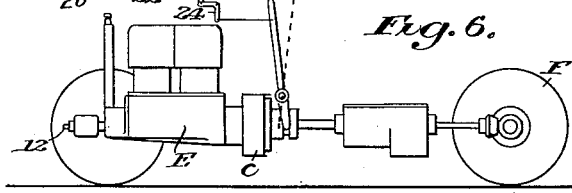
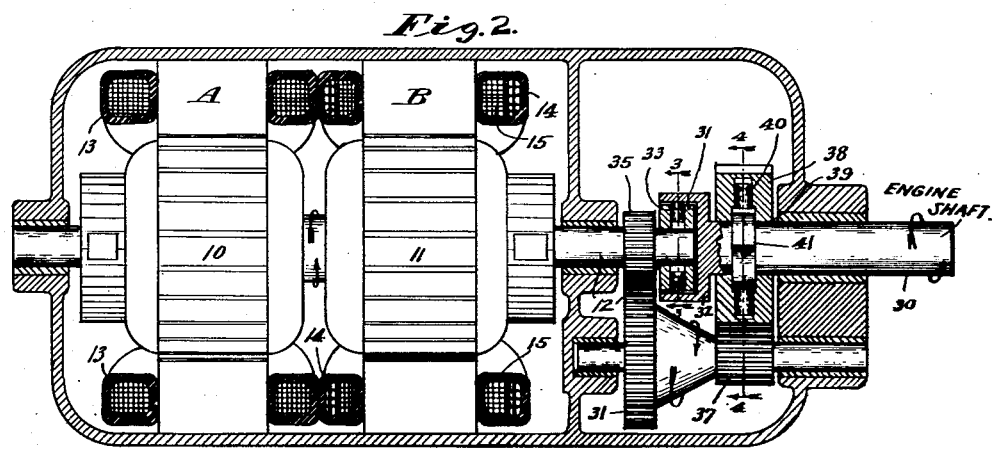
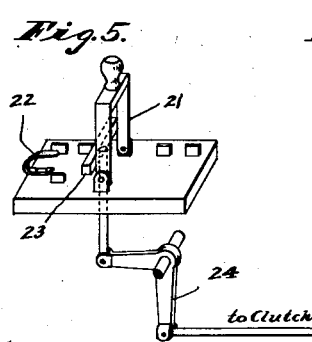
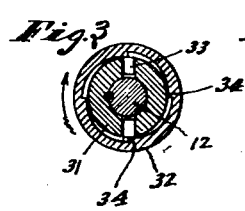
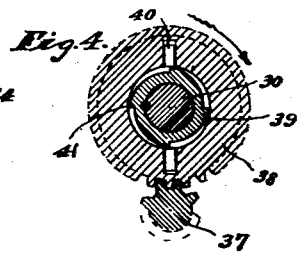
Witnesses
M. Umberger
May Layden
Inventors
John B. Dyer
George A. Johnstone.
by Arthur M. Good
Attorney

UNITED STATES PATENT OFFICE.

JOHN B. DYER AND GEORGE A. JOHNSTONE, OF ANDERSON, INDIANA.

SYSTEM FOR ELECTRICAL DISTRIBUTION.

1,150,019.  Specification of Letters Patent.  Patented Aug. 17, 1915.

Application filed February 16, 1912. Serial No. 678,049.

*To all whom it may concern:*

Be it known that we, JOHN B. DYER, a citizen of the United States, and GEORGE A. JOHNSTONE, a subject of the King of England, both residing at Anderson, in the county of Madison and State of Indiana, have invented a new and useful System for Electrical Distribution, of which the following is a specification.

Our invention relates to systems of electrical distribution, particularly as used in automobiles.

It is our object to provide a system wherein a dynamo-electric unit operating at variable speed may coöperate with a storage battery and consumption circuits of substantially constant voltage, and operate efficiently to transform energy either electrodynamically or dynamo-electrically as required. The electro-dynamic transformation is primarily for the purpose of driving or assisting a prime mover, as for starting the internal combustion engine of an automobile, while the dynamo-electric transformation is for obtaining from such prime mover energy for supplying the consumption circuits and charging the battery.

It is our further object to provide certain safeguards against the improper operation of the system.

The various novel features of our invention will appear from the description and drawings, and will be particularly pointed out in the claims.

In the drawings, Figure 1 is a diagram illustrating a preferred embodiment of our invention; Fig. 2 is a section through the dynamo-electric unit and its automatic clutches; Figs. 3 and 4 are sections on the lines 3—3 and 4—4, respectively, of Fig. 2; Fig. 5 is a detail of the main switch and its safety devices, and Fig. 6 is a diagrammatic view showing the mechanical connections between the various parts.

The dynamo-electric unit comprises two dynamo-electric machines A and B, the armatures 10 and 11 of which are mounted, preferably in the same frame, on a common shaft 12, or are otherwise mechanically connected to operate at equal or proportional speeds. The armature 10 rotates in a magnetic field produced by a field winding 13, and the armature 11 in one produced by assisting series field windings 14 and 15. The various field windings, or some of them, are provided with taps 16 whereby the number of their effective turns may be adjusted. This dynamo-electric unit may be a commercial motor-generator set.

Preferably, the dynamo-electric unit may be connected to a storage battery 20 in either of two ways, in each of which the field winding 13 is connected across the battery terminals and thus given a substantially constant excitation. This connection is made by a double throw, double pole, main switch 21, one blade of which coöperates with two terminals on each side while the other coöperates with but one terminal and that on the left hand side. When this switch 21 is in its lefthand or "starting" position, which may some times be omitted entirely, the two machines A and B comprising the unit are connected in parallel with each other across the battery as shunt and series wound machines respectively, the field winding 15 being cut out; and when it is in its righthand or "running" position, the armatures 10 and 11 and the field windings 14 and 15 are all in series, the machine A becoming in effect a separately excited machine, and the relation between the directions of current flow in the armature 11 and its field windings being unchanged. The main switch 21 is preferably provided with a spring 22 for throwing it out of starting position unless it is held there manually; and with a lock 23 operated by suitable connecting mechanism 24 extending to the clutch C between the engine E and the driving wheels F if the system is used in an automobile, for preventing the switch from being moved to starting position unless such clutch is open.

There may be any number of consumption circuits; as shown, there are three, for head lights, signal lights, and engine ignition, respectively. By a double throw switch 25, the ignition circuit may be connected across either the battery 20 or the armature 10, to obtain either a substantially constant voltage or one which increases with the speed of the apparatus. By switches 26 and 27 respectively, the head light and signal light circuits may be connected across the battery, which is the same as across the dynamo-electric unit when the main switch is in righthand or running position. The switches 26 and 27 are preferably double blade switches, one blade controlling the corresponding circuit and the other a shunt around part or all of a series field winding for the machine B.

As shown, this extra blade controls a shunt around the whole of the winding 15, either completely short circuiting such winding as does the switch 26, or shunting it through a resistance 28 as does the switch 27.

The shaft 12 of the dynamo-electric unit is connected to the shaft 30 of, or in mechanical connection with, a prime mover or other source of mechanical power, such as an internal combustion driving engine E for an automobile, by an alternative mechanical driving connection having different speed ratios. In the preferred arrangement, the shafts 12 and 30 are coaxial, a collar 31 fixed on the end of the shaft 12 fitting into a socket 32 on the adjacent end of the shaft 30 and carrying pawls 33 which are thrown outward by centrifugal force against internal ratchet teeth 34 in such socket. The parts moving in the direction of the arrows, if the shaft 30 tends to go faster than does the shaft 12 the former drives the latter by means of the automatic clutch formed by the collar 31 and socket 32. In addition, a pinion 35 on the shaft 12 meshes with a gear 36 of a back gear, the pinion 37 of which meshes with a gear 38 loose on the shaft 30. The gear 38 fits over a collar 39 fixed on the shaft 30, and is provided with inwardly acting pawls 40 which coöperate with ratchet teeth 41 on the periphery of the collar 39. The parts moving in the direction of the arrows, if the shaft 30 tends to go slower than the fraction of the speed of the shaft 12 determined by the gear ratio of the back gearing, the former shaft is driven by the latter by means of such back gearing and the automatic clutch formed by the gear 38 and collar 39. This driving action can only take place, however, if it starts with the gear 38 at a stand-still or below a predetermined speed, as otherwise the action of centrifugal force will hold the pawls 40 out of engagement with the collar 38. If the speed of the shaft 30 is between the aforesaid fraction and the whole of the speed of the shaft 12, neither shaft drives the other.

The operation is as follows: Assume that the system is in an automobile and that the internal combustion driving engine of the latter is at rest. The lights, if desired, may be supplied from the battery 20. To start the engine, the switch 21 is preferably thrown and held to the left or starting position, thus connecting the two machines A and B of the dynamo-electric unit separately across the battery. The switch cannot be thus thrown, because of the lock 23, unless the driving clutch C between the engine E and wheels F is open. The two machines now operate as shunt and series motors respectively, the winding 15 preferably being cut out as shown, and assist each other to drive the engine through the back gear and the automatic clutch within the gear 38. The ignition circuit is closed by the switch 25; which may be thrown to either position, but preferably to the battery contact at this time. When the engine begins to operate by its own power, it soon drives the shaft 30 and the collar 39 faster than the electric motors drive the gear 38, thus relieving such motors of the work of driving the engine. The switch 21, which until now has been held manually in starting position, may now be moved to its right-hand or running position, where it will remain without attention. This puts the two armatures 10 and 11 and the two series fields 14 and 15 of the latter in series, the two machines continuing to act as motors supplied from the battery 20; the current in the armature 10 is in the same direction as before, and that in both the armature 11 and the field winding 14 in the opposite direction. The switch 21 may be thrown to this position to start the engine, but the starting thereby obtained is not so efficient as that above described. When the engine has increased sufficiently in speed, the shaft 30 attains and tends to exceed the speed of the shaft 12, whereupon the teeth 34 engage the pawls 33 and the engine begins to drive the dynamo-electric unit. As the speed increases, the voltage of the armature 10 rises and the motor current falls until such voltage equals that of the battery 20, when no current flows in either armature or the series field windings 14 and 15. As the speed increases further, the voltage of the armature 10 exceeds that of the battery 20, and begins to supply current to relieve the battery of the consumption circuit load and then to charge the battery. This current flows through the armatures 10 and 11 and the series field windings 14 and 15 in the opposite direction from what it did previously, and the machine B, having the current reversed in both its armature and its field windings, thus continues to act as motor, helping to drive the armature 10. The counter electro motive force of the armature 11 opposes that of the armature 10 and diminishes the combined or algebraically added electro motive force of the two machines. This diminishing nearly counterbalances the augmenting due to the increased electro motive force of the armature 10, and thus maintains the combined electro motive force of the unit substantially constant. Such combined electro motive force rises very slightly, however, to produce the increased current necessary for producing the increase in electro motive force of the armature 11 requisite for the aforesaid diminishing of the combined electro motive force of the dynamo electric unit. This slight rise in voltage enables the dynamo electric unit first gradually to relieve the battery of the consumption circuit load, and then, as the current from the unit exceeds that required for the consumption circuit, to charge the battery at a rate which varies as such excess.

As the consumption circuit load varies, as, for instance, when the lights are switched on or off, and as this should not affect the impressed voltage available, the switches 26 and 27 controlling such circuits also control to some extent the field strength of the series machine B. Thus the closing of the switch 27 not only connects in the signal lights, or other load, but by connecting the resistance 28 in shunt to the field winding 15 diminishes the current flowing in the latter. This diminution is to prevent the increase of current required for the signal lights from affecting the combined voltage of the dynamo electric unit, the resistance 28 being of proper value to make the effect of such diminution just counter balance that of such increase of current on the series wound machine B. Instead of shunting the field winding 15 with a resistance, the switch 26, when closed to connect in the head lights, short circuits such winding, the number of turns of the winding 15 bearing such ratio to those of the winding 14 that the effect of such short circuiting is the same as that above described in connection with the shunting of such winding 15 by the resistance 28. The ratios between the numbers of turns of the windings 14 and 15 and between the resistance values of the resistance 28 and the field winding 15 are of course dependent on the current required for the head light and signal light, or other consumption, circuits.

If for any reason the engine is allowed to stop while the switch 21 is closed, in either position, the dynamo electric unit will continue to run, as motor taking current from the battery 20. However, this will not interfere with the stopping of the engine, for, because the pawls 40 are held out of engagement with the collar 39 by centrifugal force, the automatic clutch within the gear 38 will not lock as the speed of the shaft 30 falls below that of such gear. To start the engine again by the motor action of the dynamo electric unit, it is necessary to open the switch 21 and allow the unit to come substantially to rest, so that the pawls 40 may engage the teeth 41.

Our invention is capable of considerable modification in its details, and we aim to cover all modifications which come within the spirit and scope of our invention.

What we claim as new is:

1. In combination, a dynamo-electric unit, a storage battery, a switch for connecting said storage battery and said unit, said switch being capable of being left permanently in closed position and the movements of said switch being independent of said storage battery and said unit, a shaft for mechanical connection with a source of mechanical power, and an alternative mechanical driving connection of different speed ratios between said dynamo-electric unit and said shaft, said driving connection including two automatic clutches which act when the ratio between the speeds of said shaft and said dynamo electric unit tends to be above the higher and below the lower speed ratios respectively of such mechanical driving connection.

2. In combination, a dynamo-electric unit, a storage battery, means for connecting said storage battery to said unit, a shaft for mechanical connection with a source of mechanical power, and an alternative mechanical driving connection of different speed ratios between said dynamo-electric unit and said shaft, said driving connection including two automatic clutches which act when the ratio between the speeds of said shaft and said dynamo-electric unit tends to be above the higher and below the lower speed ratios respectively of such mechanical driving connection, and the clutch which operates when the ratio between such speeds tends to be below said lower speed ratio of the mechanical driving connection being initially operative only when the speed of the dynamo-electric unit is below a predetermined value.

3. In combination, a dynamo-electric unit, a storage battery, means for connecting said storage battery to said unit, a shaft for mechanical connection with a source of mechanical power, and an alternative mechanical driving connection of different speed ratios between said dynamo-electric unit and said shaft, said driving connection including two automatic clutches which act when the ratio between the speeds of said shaft and said dynamo-electric unit tends to be above the higher and below the lower speed ratios respectively of said mechanical driving connection, and the clutch which operates when the ratio between such speeds tends to be below the lower speed ratio of the mechanical driving connection being rendered operative by means which tend to become inoperative by the action of centrifugal force.

4. In combination, a dynamo electric unit, a storage battery, means for connecting said storage battery to said unit, a shaft for mechanical connection with a source of mechanical power, and an alternative mechanical driving connection of different speed ratios between said dynamo-electric unit and said shaft, said driving connection including two automatic clutches which act when the ratio between the speeds of said shaft and said dynamo-electric unit tends to be above the higher and below the lower speed ratios respectively of said mechanical driving connection, and the clutches which operate when the ratio between such speeds tends to be above the higher and below the lower speed ratios of the mechanical driving connection being rendered operative respectively by means which tend to become operative and inoperative respectively by the action of centrifugal force.

5. In combination, a dynamo-electric unit, a source of electro-motive force, means for connecting said source of electro-motive force and said dynamo-electric unit, said means being capable of being left permanently in connecting condition and the operation of said means to make and break such connection being independent of the dynamo-electric unit and the source of electromotive force, a shaft for mechanical connection with a source of mechanical power, and an alternative mechanical driving connection of different speed ratios between said dynamo-electric unit and said shaft, said driving connection including two automatic clutches which act when the ratio between the speeds of said shaft and said dynamo-electric unit tends to be above the higher and below the lower speed ratios respectively of said mechanical driving connection.

6. In combination, a dynamo-electric unit, a source of electro-motive force, means for connecting said source of electro-motive force and said dynamo-electric unit, said means being capable of being left permanently in connecting condition and the operation of said means to make and break such connection being independent of the dynamo-electric unit and the source of electromotive force, a shaft for mechanical connection with a source of mechanical power, and an alternative mechanical driving connection of different speed ratios between said dynamo-electric unit and said shaft, said driving connection including two automatic clutches which act when the ratio between the speeds of said shaft and said dynamo-electric unit tends to be above the higher and below the lower speed ratios respectively of said mechanical driving connection, and the clutch which operates when the ratio between such speeds tends to be below said lower speed ratio of the mechanical driving connection being initially operative only when the speed of the dynamo-electric unit is below a predetermined value.

7. In combination, a dynamo-electric unit having a shaft, a storage battery, means for connecting said storage battery to said unit, a shaft in alinement with the shaft of the dynamo electric unit, an automatic clutch for directly connecting said two shafts if the speed of the second tends to exceed that of the first, and a back gear between said two shafts, said back gear including a second automatic clutch which requires for its operation that the speed of the second shaft tends to be below a fraction of the first equal to the speed reduction ratio of the back gear.

8. In combination, a variable speed prime mover requiring outside energy for starting it, a storage battery, two mechanically connected dynamo electric machines, means for electrically connecting the armatures of said two machines across said battery either in parallel paths or in series with each other, and means for mechanically connecting said two machines to said prime mover, whereby the storage battery may supply energy to the prime mover through the dynamo-electric machines or may receive energy from the prime mover through the dynamo-electric machines.

9. In combination, a storage battery, two mechanically connected dynamo electric machines, means for electrically connecting the armatures of said two machines across said battery either in parallel paths or in series with each other, a prime mover, means for mechanically connecting said two machines to said prime mover, means for mechanically connecting said prime mover to a mechanical load, and means for preventing the armatures of the two dynamo-electric machines from being connected across said battery in parallel paths when said prime mover is connected to said load.

10. In combination, a storage battery, two mechanically connected dynamo-electric machines, and means for connecting the armature of one machine, the field winding of that machine, and the armature and part of the field windings of the other machine in separate branch circuits across said battery, and for changing the connections so that the armature and field windings of the second machine are reversely connected in the branch circuit of the armature of the first machine in series with said armature.

11. In combination, a storage battery, two mechanically connected dynamo-electric machines, the field of one of said machines being connected to have a substantially uniform excitation whenever such machine is operating electrically, and means for connecting the armature of that machine and the armature and part of the field windings of the other machine in separate branch circuits across said storage battery, and for changing the connections so that the armature and field windings of said second machine are reversely connected in the branch circuit of the armature of the first machine in series with said armature.

12. In combination, a storage battery, two mechanically connected dynamo-electric machines, and means for connecting the armature of one machine, the field winding of that machine, and the armature and part of the field windings of the other machine in separate branch circuits across said battery, and for changing the connections so that the armature and field windings of the second machine are connected in the branch circuit of the armature of the first machine in series with said armature.

13. In combination, a storage battery, two mechanically connected dynamo-electric machines, the field of one of said machines being connected to have a substantially uniform excitation whenever such machine is operating electrically, and means for connecting the armature of that machine and the armature and part of the field windings of the other machine in separate branch circuits across said storage battery, and for changing the connections so that the armature and field windings of said second machine are connected in the branch circuit of the armature of the first machine in series with said armature.

14. In combination, a storage battery, two mechanically connected dynamo-electric machines, the armatures of said two machines and the field winding of one being connected in series across said battery, and the field winding of the other being separately excited, and the field windings of the two machines being so connected that the electromotive forces generated by the two armatures oppose each other when the machines are driven above a predetermined speed.

15. In combination, a storage battery, two mechanically connected dynamo-electric machines, the armatures of said two machines and the field windings of one being connected in series across said battery, and the field winding of the other being separately connected across said battery, and the field windings of the two machines being so connected that the electromotive forces generated by the two armatures oppose each other when the machines are driven above a predetermined speed.

16. In combination, a storage battery, two mechanically connected dynamo-electric machines, the armatures of said two machines and the field winding of one being connected in series across said battery, and the field winding of the other being separately excited, and the field windings of the two machines being so connected that the electromotive forces generated by the two armatures oppose each other when the machines are driven above a predetermined speed, a consumption circuit, and a switch for connecting said consumption circuit across said battery and at the same time diminishing the effect per unit of current of the series field winding on the machine provided with it.

17. In combination, a storage battery, two mechanically connected dynamo-electric machines, the armatures of said two machines and the field winding of one being connected in series across said battery, and the field winding of the other being separately excited, and the field windings of the two machines being so connected that the electromotive forces generated by the two armatures oppose each other when the machines are driven above a predetermined speed, a consumption circuit, a resistance, and a switch for connecting said consumption circuit across said battery and said resistance across points on the field winding of the series wound machine.

18. In combination, a storage battery, two mechanically connected dynamo-electric machines, the armatures of said two machines and field windings of one being connected in series across said battery, and field windings of the other being separately excited, and said field windings of the two machines being so connected that the electromotive forces generated by the two machines oppose each other when the machines are driven above a predetermined speed, a consumption circuit, a shunt around field windings of the series wound machine, and a switch for controlling both the condition of said shunt and the connection of said consumption circuit across said battery.

19. In combination, a storage battery, two mechanically connected dynamo-electric machines, the armatures of said two machines and field windings of one being connected in series across said battery, and field windings of the other being separately excited, and said field windings of the two machines being so connected that the electromotive forces generated by the two armatures oppose each other when the machines are driven above a predetermined speed, a consumption circuit, a normally open shunt around field windings of the series wound machine, and a switch for connecting said consumption circuit across said battery and closing said shunt.

20. In combination, a storage battery, a source of mechanical energy, two mechanically connected dynamo-electric machines, means for electrically connecting the armatures of said two machines across said storage battery either in parallel paths or in series with each other, a shaft arranged to receive energy either from said dynamo-electric machines or from said source of mechanical energy, and clutching means between said shaft and said dynamo-electric machines.

21. In combination, a storage battery, two mechanically connected dynamo-electric machines, means for electrically connecting the armatures of said two machines across said storage battery either in parallel paths or in series with each other, a shaft arranged to receive energy either from said dynamo-electric machines or from another source of energy, clutching means between said shaft and said dynamo-electric machines, means for mechanically connecting said shaft to a mechanical load, whereby said shaft may receive energy from the storage battery through the dynamo-electric machines or may supply energy to said storage battery through the dynamo-electric machines, and means for preventing the armatures of the two dynamo-electric machines from being connected across said battery in parallel paths when said shaft is mechanically connected to said mechanical load.

In witness whereof, we have hereunto set our hands and seals at Anderson, Indiana, this 13th day of February, A. D. one thousand nine hundred and twelve.

JOHN B. DYER. [L. S.]
GEORGE A. JOHNSTONE. [L. S.]

Witnesses:
  ALICE DYER,
  LELIA L. KNOWLAND.